April 7, 1959 L. C. CONNER 2,880,782
PNEUMATIC SEAT
Filed Nov. 19, 1957
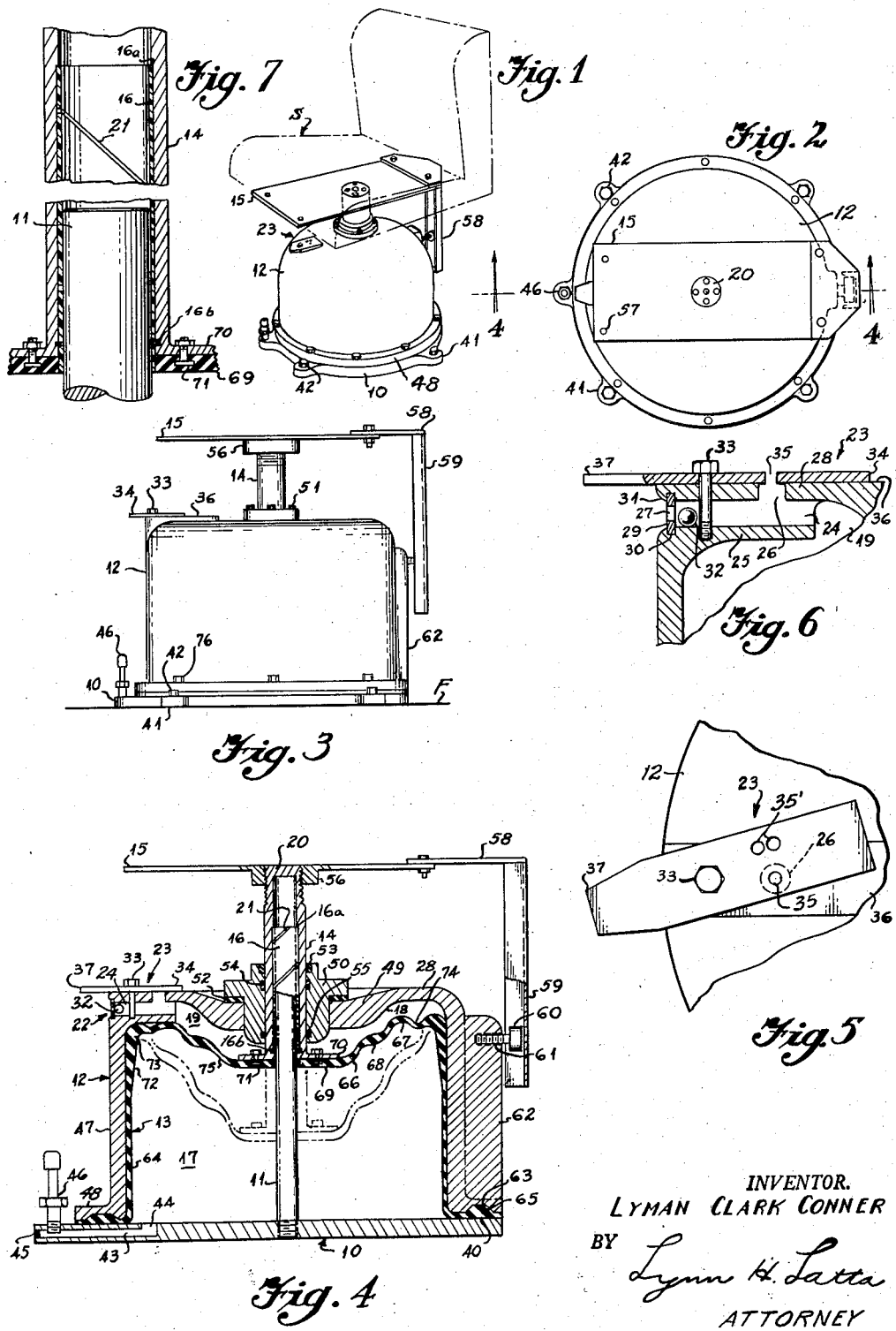
INVENTOR.
LYMAN CLARK CONNER
BY
Lynn H. Latta
ATTORNEY

United States Patent Office 2,880,782
Patented Apr. 7, 1959

2,880,782

PNEUMATIC SEAT

Lyman Clark Conner, Los Angeles, Calif., assignor of one-half to Hubert R. Crane, Los Angeles, Calif.

Application November 19, 1957, Serial No. 697,496

10 Claims. (Cl. 155—9)

This invention relates to pneumatic vibration absorbing mountings for vehicle seats and for seats used in connection with vibration developing apparatus other than vehicles. The invention is particularly useful in cushioning a driver's seat in a heavy vehicle such as cross country trucks and tractors for trailer units, earth moving vehicles such as steam shovels, hauling carriers, bull dozers and other on and off the highway equipment, locomotives, testing equipment, etc.

The common type of seat suspension heretofore commonly utilized in such vehicles and apparatus is one employing springs of various kinds. More recently it has been proposed to utilize pneumatic cushioning as a means for supporting seats used in vehicles such as cross country trucks, tractors etc. Such a pneumatic seat is shown for example in the patent of Frederick J. Decker, No. 2,760,552 issued August 28, 1956. The primary object of the present invention, as in the pneumatic seat disclosed in said Decker patent, is to obtain an improved pneumatic cushioning operation involving the combination of floating support of the seat upon an air cushion in a main cushioning chamber of large volume to softly absorb road shocks in the downward movement of the seat, and a snubbing action attained by compression of a much smaller volume of air in a rebound snubbing chamber which is disposed in axially opposed relation to the main cushioning chamber, such snubbing action commencing almost instantly when the seat starts an upward movement and being attained by the immediate closing of a check valve which is operative to trap the air in the rebound snubbing chamber during the upward movement and is further operative to vent the rebound snubbing chamber during the downward movement of the seat so as to release the seat from any resistance to such downward movement in the rebound snubbing chamber. This type of pneumatic seat is further characterized by a controlled bleed of air from the rebound snubbing chamber over an appreciable time period during the upward movement of the seat, with a dash pot action which slows down the upward movement and avoids any pulsating action of the seat.

This type of pneumatic seat, utilizing a piston and cylinder construction for the soft cushioning support and the rebound snubbing action referred to above, has proven to be a definite improvement over the spring mounted seats commonly used in the past. However, the piston and cylinder construction utilized in the prior pneumatic seats have been of somewhat complex and expensive construction, requiring expensive machining operations, subject to some loss of cushioning efficiency through wear over extended periods of service, and otherwise subject to improvement. Accordingly, the main object of the present invention is to provide improvements in the type of pneumatic seat referred to above, greatly simplifying and reducing expense of construction thereof, improving its efficiency of operation, improving the cushioning action thereof, and otherwise providing an improved and more satisfactory pneumatically cushioned seat mounting.

A particular object of this invention is to provide a pneumatic seat having an improved cushioning action wherein the resistance to downward movement of the seat commences with maximum softness or yieldability and builds up to maximum resistance through a considerably wider range than can be obtained in the cushioning action in a piston and cylinder mechanism. Toward the attainment of this object, the invention contemplates a seat mounting wherein cushioning action is the composite result of compression of air in the main cushioning chamber and the stretching of a diaphragm which defines a portion of the wall area of said chamber. More specifically, the invention contemplates an arrangement wherein in the early stage of cushioning action the diaphragm offers no appreciable resistance to the downward movement of the seat and all cushioning action is derived from the initial compression of the air in the main chamber, and wherein the later stages of cushioning action are derived from the combined resistance of the diaphragm to being stretched and the resistance of the air to compression, which increases in proportion to the degree of compression.

A further object of the invention is to provide such a pneumatic seat mounting, including a diaphragm of improved construction such as to provide the improved cushioning action referred to above.

A further object of the invention is to provide an improved pneumatic seat mounting utilizing improved check valve and bleed valve mechanism for improving the operation of the cushioning mechanism.

A further object is to provide a pneumatic seat mounting mechanism embodying improved means for maintaining the seat oriented against rotation about its major axis while permitting free vertical cushioning movement of the parts.

Another object is to provide an improved seal between the tubular shaft which transmits the support from the diaphragm to the seat, and a casing in which the shaft is slidably mounted for vertical cushioning movement of the seat.

Other objects and advantages will become apparent in the ensuing specifications and appended drawing in which:

Fig. 1 is a perspective view of my improved seat mounting, shown as supporting a seat which is illustrated in phantom;

Fig. 2 is a plan view of the mounting;

Fig. 3 is a side elevational view of the mounting;

Fig. 4 is an axial sectional view of the mounting;

Fig. 5 is a fragmentary plan view of the casing of the apparatus, illustrating the adjustable bleed valve;

Fig. 6 is a detail sectional view of the valve mechanism; and

Fig. 7 is a detail sectional view of the guide post and bushing.

Referring now to the drawing in detail, I have shown therein, as an example of one form in which the invention may be embodied, a support mechanism comprising, in general, a base 10, a guide post 11 anchored to base 10 and projecting upwardly on the main axis of the apparatus, a dome shaped casing 12 attached to the base 10, a dome shaped diaphragm 13 mounted between the base 10 and casing 12, a tubular support stem 14 for transmitting cushioning support from the diaphragm 13 to the seat, and a seat mounting bracket 15 in the form of a cross head secured to the upper end of stem 14, to which a seat S, shown in phantom in Fig. 1, may be mounted. Post 11 slides snugly but smoothly in a bearing sleeve 16 of nylon sheet or ribbon material, cut on a bias, wrapped helically around the post, seated in a counterbore in stem 14, its upper end retained against a shoulder 16a in stem 14, and its lower end retained against a snap ring 16b seated in an internal groove in stem 14.

Defined between the diaphragm 13 and the base 10 is a main cushioning chamber 17. Defined between the diaphragm 13 and the crown 18 of the casing 12 is a rebound snubbing chamber 19. The air space between the upper end of guide post 11 and a closed upper end 20 of stem 14 communicates with the main cushioning chamber 17 through a helical crack 21 between turns of sleeve 16.

Unobstructed flow of air into rebound cushioning chamber 19 during downward movement of the seat is provided for by a check valve 22. Controlled bleed of air from the rebound snubbing chamber 19 during upward movement of the seat is provided for by a bleed valve 23. Simplicity is attained by combining the two valves in a composite valve unit including a bore 24 in a boss 25 of casing 12, and a bleed port 26 in the crown portion 28 of casing 12, the port 26 communicating with the bore 24 which constitutes a valve passage communicating between the rebound snubbing chamber 19, the bleed port 26 and a check valve port 27. Boss 25 is formed integrally with the casing crown 28 at one side of the casing, and has an external end portion in which is mounted a valve seat washer 29. Washer 29 is received in a counterbore 30 at the outer end of bore 24 and is secured by staking 31 at the outer extremity of the boss 25. Check valve port 27 is defined as the aperture in valve seat washer 29, and the valve seat is defined at the inner central annular edge of the washer at the intersection of port 27 with the internal face of the washer 29. A valve ball 32 is associated with this valve seat, normally resting at the bottom of bore 24 eccentrically below the axis of bore 24 and adjacent the washer 29, and being drawn into the port 27 to engage the valve seat and close the port in response to upward movement of air in passage 24. The valve ball 32 is of lightweight, highly wear resistant, smooth homogeneous material, very slightly yielding or pliable so as to effect a tight seal against the valve seat in response to air pressure in the passage 24. I find that these results are best obtained by using a material such as polymeric amide ("nylon"). The valve ball is retained in association with the seat washer 29 by the shank of a screw 33 which extends through a thin flat leaf 34 constituting the body of the bleed valve 23. In the valve leaf 34 is a restricted aperture 35 which is adapted to have full area registration with the port 26 or can be shifted to a position only partly registering with the port 26 so as to reduce the effective size of the aperture 26. To this end, the bleed valve leaf 34 is pivoted on the screw 33, the head of which snugly engages its upper face to load the leaf 34 into snug engagement with a machined flat valve seat face 36 on casing crown 28, for substantially sealing the bleed valve body 34 to the casing. The end of bar 34 opposite from aperture 35 constitutes a handle 37 for manipulating and adjusting the valve, the handle 37 projecting beyond the outer end of boss 25.

Referring now to Fig. 5, a pair of supplementary bleed apertures 35', disposed on a line parallel to the longitudinal axis of the bar 34 and equally spaced on respective sides of the center of port 26 when aligned therewith, may be utilized. A finer adjustment can be obtained by adjusting the apertures 33' with respect to port 26.

Leaf 34, when unstressed, is arched slightly upwardly in the center and when tightened against the valve face 36, is flattened into resiliently loaded engagement therewith.

Base 10 is in the form of a relatively thick circular flat disc having adjacent its periphery an annular machined flat upper face 40 providing a seat for a diaphragm 13, and having a plurality of circumferentially spaced apertured ears 41 through which anchor screws 42 may be extended for anchoring the base to a supporting surface F (Fig. 3).

In one side of base 10 is a radially extending passage 43 communicating with chamber 17 through an axial port 44 at its inner end. The outer end of passage 43 is closed by a plug 45 and communicates with a filling valve 46 of the check valve type which is threaded through the wall of the base and into the passage 43. Valve 46 may be of the common type utilized in pneumatic tires for inflation thereof, and its purpose in the present apparatus is to provide for the injection of air under pressure into the main pneumatic chamber 17, using a conventional air hose at a filling station, or any air pressure source such as a hand pump or any other air pressure source. Thus a vehicle driver may at any time adjust the amount of air in the chamber 17 to any selected pressure, replenishing any leakage thereof. Also, the pressure of air in chamber 17 may be adjusted so as to vary the supporting capacity of the mount in accordance with the weight of the person who is to occupy the seat.

The casing 12 is of dome shape, including a cylindrical lateral wall section 47, a radially outwardly extending flange 48 at the lower extremity thereof, and the annular crown portion 28 at the top, which crown portion has a reentrant central annular collar portion 49 provided with a cylindrical bore in which is mounted, with a press-fit, a flanged bushing 50 through which the stem 14 extends. The flange of bushing 50 is clamped down against the upper face of collar 49 by a series of cap screws 51 (Fig. 3) extending therethrough and threaded into collar 49, a gasket 52 being interposed to seal the bushing 50 to the casing 12. Disposed in a counterbore in the upper end of bushing 50 is a bearing ring 53 of nylon material. Below the bearing ring 53 is an annular internal groove in which is seated felt wiper ring 54 which is lubricant-impregnated to keep the outer surface of stem 14 lubricated. A neoprene O-ring 55 is seated in an annular internal groove at the lower end of the bore in bushing 50 and functions to seal the support shaft 14 to the casing 12 against pressure of air in chamber 19.

Guide post 11 has a reduced threaded lower end which is threaded into base 10 as indicated. Post 11 has a finished cylindrical surface which is loosely fitted to the cylindrical inner wall of stem 14 for guiding the latter.

Bracket 15 has a central boss 56 into which is threaded the closed upper end of stem 14, and is provided with four corner openings 57 for bolting the base of the seat 16 to the bracket 15. To one end of bracket 15 is secured a guide 58 of L-shape, guide 58 including a vertical channel 59 in which is received a roller 60 rotatably mounted upon a pin 61. Pin 61 is mounted in an elongated vertical boss 62 integral with one side of the lateral wall section 47 of casing 12, preferably diametrically opposite to the valve assembly 22, 23. Roller 60 is preferably of nylon material for long wear and is fitted in the channel 59 with very slight clearance for relative engagement against one side flange or the other thereof depending upon which direction the seat may tend to rotate about the axis of post 11.

In the under side of flange 48 of casing 12 is an annular face groove 63. Diaphragm 13 comprises a cylindrical skirt 64, an integral radially outwardly extending rim 65 on the lower extremity thereof, and a head 66 which includes one or more corrugations 67, 68 and a flat central portion 69 against which is secured a flange 70 on the lower end of support shaft 14. Bolts 71, with heads embedded in the central portion 69 of the diaphragm and extended through the flange 70 and secured with nuts, may be utilized for attaching the shaft 14 to the diaphragm. Rim 65 is clamped between casing flange 48 and the annular seat 40 on base 10, by means of cap screws 76 extended through flange 48 and threaded into the base. Thus rim 65 functions as a gasket to pneumatically seal the chamber 17.

The diaphragm 13 is particularly characterized by the lateral wall portion 64 thereof being relatively thin from its lower extremity for approximately two-thirds of its height, and then gradually thickening in the upper portion 72 thereof to maximum thickness at the shoulder 73 defining the top of the diaphragm at its outer diameter. The shoulder 73 is arched upwardly and inwardly and then downwardly, where it becomes thinner, being joined to the main corrugation 67 by a relatively thin, downwardly arched annular web section 74. The corrugation 67 is arched upwardly and is somewhat thicker than web 74 so as to be form-retaining. The corrugation 68 is also slightly thicker than the thinnest portions of the diaphragm.

In the operation of the apparatus, as the seat moves downwardly (e.g. under the reaction of the passage of the vehicle over a rising portion of a road surface) the central portion of the diaphragm will be initially stretched downwardly, flattening the corrugations 68 and 67 to some extent owing to the flexibility of the areas including the webs 74 and 75. This occurs without inward deflection of the thickened upper portion 72 and shoulder 73 of the diaphragm, the thickness and stiffness of these parts resisting such inward deflection. Consequently in the initial or upper stage of downward movement the parts 72 and 73 remain in contact with the inner wall of the casing 12, thus avoiding any substantial increase in the volume of rebound cushioning chamber 19 during this initial downward stage. At the same time, the air in main chamber 17 is at minimum compression in the upper stage. The overall effect is a maximum softness of cushioning action, due primarily to the large volume of air in chamber 17.

Maintaining the volume of chamber 19 at a minimum in proportion to that of chamber 17 in the stage of initial downward movement is important in that for most of the smaller shocks and vibrations, a relatively small amplitude of vertical movement of the seat will be cushioned by the movement within this upper stage of movement, and, with the volume of chamber 19 maintained at a minimum, the snubbing effect which is attained in the upward movement of the diaphragm, is accentuated because of the fact that there has been very little enlargement of its volume in this upper stage of movement, and accordingly there is a minimum room for compression and maximum compression therefore occurs for any given amount of upward movement. This sharpness of snubbing action of the upward movement is important in dampening out rebound. On the other hand, whatever enlargement of volume does occur in the chamber 19 on the downward movement does not result in any reduction of pressure in chamber 19 (which would resist the downward movement) since the check valve 22 provides for free entry of air into the chamber 19 without resistance. This air is trapped in the chamber 19 and is gradually released through the bleed valve 23 in the upwardly return movement of the seat.

Where a very heavy road shock is imposed upon the apparatus, the initial stage of downward movement described above, with its soft cushioning action, will absorb only a small portion of the shock, and the downward distention of the diaphragm will be continued. In this advanced stage of downward movement, the shoulder 73 will not be peeled inwardly away from the inner wall of casing 12. Instead, the head 66 will be stretched to a relatively deep cone shape as indicated in broken lines in Fig. 4, the air pressure in chamber 17, combined with the thickness of upper skirt portion 72, 73, maintaining such upper skirt portion 72, 73 in substantial contact with casing wall 47. An increasing resistance to stretch will develop in the stretching of the central area 66 of the diaphragm. Still further build-up in resistance to the downward movement will occur in the increasing compression of air in the chamber 17 as the volume thereof is decreased. The summation of these factors of resistance to downward movement results in a build-up over a wide range of resistances beginning with the very mild resistance at the top of a downward stroke and ending with a very high load resistance at the bottom of a deep stroke. That is to say, the range of resistance values for a given amplitude of stroke in the present apparatus is greatly increased over that hitherto attained, the initial resistance being softer and the final resistance being heavier or of higher value.

A further improved feature of operation of the apparatus, attained in a deep-stroke operation, is a correspondingly wider range of resistances to the upward movement. This arises from the fact that the volume of chamber 19 increases on a fairly steep curve as the diaphragm moves from a range of slight deflection to the range of deep deflection, and correspondingly upon the up stroke, the volume is initially relatively large (in proportion to the normal volume of chamber 19) and there is therefore an initial cushioning of the upward return movement which rapidly is converted into a high load resistance as the volume of chamber 19 is decreased on the upward movement of the central portion of the diaphragm. The high pressure thus developed in the chamber 19 in the rebound from a deep stroke holds back the final return movement while the air is actually bled through bleed valve 23, and while there may be a fairly rapid beginning of the return movement, it will quickly be slowed down to a gradual return which is devoid of any rebound.

The lightweight nylon ball valve 32 is pulled away from its seat instantaneously when the diaphragm commences a downward movement, so as to prevent any creation of vacuum even at the outset. Thus the sole opposition to the downward movement is the large volume cushion of air below the diaphragm. When the upward movement commences, on the other hand, the valve intermediately is thrust to its seat and the chamber 19 is thus immediately sealed to provide maximum high pressure snubbing action.

The function of the telescoping connection between the post 11 and stem 14 is to guide the bracket 15 for vertical movement along the axis of the mounting while cushioning support is transmitted from the air cushion in chamber 17 through diaphragm 13, stem 14 and bracket 15 to the seat. Bearing sleeve 16 holds the post 11 in accurate coaxial relation to the casing 12, preventing canting and binding which was a difficulty experienced with the pneumatic seats of the prior art. The nylon material of the bearing sleeve is extremely tough and relatively hard, acquires a highly polished surface as the post 11 slides therein, and shows no wear over many months of operation. It provides a very low friction bearing surface against which the post 11 will slide freely while being closely guided. Air will move back and forth in the crack 21 between the air space above the post and the cushioning chamber 17.

Instead of the wrap-around sleeve 16, the sleeve can be a short length of nylon tubing, press fitted into the counterbore of stem 14 and having at its lower end a flange to locate against the lower end of the stem 14. A groove extending longitudinally in the sleeve can be utilized to provide an air passage for transfer of air as the seat moves up and down. The invention also contemplates a modification wherein the nylon bearing sleeve will seal the space above the post 11 to provide an auxiliary air cushion.

I claim:

1. In a pneumatically cushioned seat mounting: a base; a guide post secured to said base and extending upwardly therefrom; a tubular support stem receiving said post in its lower end; a dome-shaped casing including, an annular lateral wall extending upwardly from said base, and a crown extending inwardly from the upper extremity of said lateral wall and having a central bearing through which said stem is slidably extended; a dome-shaped diaphragm including a skirt fitted within said lateral wall and sealed thereto at the lower extremity thereof, and a head extending inwardly from the upper extremity of said skirt adjacent said crown and secured and sealed to the lower end of said stem; a seat bracket on the upper end of said stem; a relatively large volume cushioning chamber being defined between said diaphragm and base and a relatively small diameter rebound snubbing chamber being defined between said diaphragm head and said crown; a check valve and a bleed valve in said casing, both communicating said rebound snubbing chamber with atmosphere, said check valve being arranged to provide free entry of air into said snubbing chamber during down stroke of said diaphragm and to trap the air in said snubbing chamber during upstroke of said diaphragm, and said bleed valve being operative to provide a delayed action bleed of air from said snubbing chamber to delay said upstroke.

2. A seat mounting as defined in claim 1, wherein said check valve and bleed valve communicate with said snubbing chamber through a common passage.

3. A seat mounting as defined in claim 2, wherein said common passage extends radially through the side of the casing and has an annular check valve seat at its outer end; wherein said bleed valve comprises a port extending upwardly from said common passage, a valve leaf for normally covering said port, said leaf having a restricted aperture for communication with said port, and a pivot connecting said leaf to said crown for swinging movement of said leaf to adjust the effective area of said aperture in communication with said port, said pivot extending across said passage, and a check valve ball confined between said pivot and said check valve seat.

4. In a pneumatically cushioned seat mounting: a base in the form of a flat circular disc; a guide post secured to said base and extending upwardly therefrom; a tubular support stem receiving said post in its lower end and having a closed upper end; a dome-shaped casing including a bottom flange in opposed relation to said base; a cylindrical lateral wall extending upwardly from said bottom flange, and a crown extending inwardly from the upper extremity of said lateral wall and having a central bearing through which said stem is slidably extended; a dome-shaped diaphragm including a cylindrical skirt fitted within said lateral wall, a rim on the lower extremity of said skirt extending outwardly, clamped between said flange and base and sealing said casing to the base, and a head extending inwardly from the upper extremity of said skirt adjacent said crown and secured and sealed to the lower end of said stem; a seat bracket on the upper end of said stem; a relatively large volume cushioning chamber being defined between said diaphragm and base and a relatively small diameter rebound snubbing chamber being defined between said diaphragm head and said crown; a check valve and a bleed valve in said casing, both communicating said rebound snubbing chamber with atmosphere, said check valve being arranged to provide free entry of air into said snubbing chamber during down stroke of said diaphragm and to trap the air in said snubbing chamber during upstroke of said diaphragm, and said bleed valve being operative to provide a delayed action bleed of air from said snubbing chamber to delay said upstroke.

5. A seat mounting as defined in claim 4, wherein said diaphragm head is of reentrant, dished form and joined to said skirt by a thickened shoulder.

6. A seat mounting as defined in claim 1, wherein said diaphragm head has a reentrant central collar, a thickened, inturned annular shoulder at the upper extremity of said skirt, a thickened annular corrugation between said shoulder and said central collar, and relatively thin annular webs joining said central collar to said corrugation and the latter to said shoulder respectively, said stem having at its lower end a flange secured to said central collar.

7. A seat mounting as defined in claim 1, wherein said diaphragm head has a reentrant central collar, a thickened, inturned annular shoulder at the upper extremity of said skirt, a thickened annular corrugation between said shoulder and said central collar, and relatively thin annular webs joining said central collar to said corrugation and the latter to said shoulder respectively, said stem having at its lower end a flange secured to said central collar; said skirt being relatively thin in its lower portion and being gradually thickened toward and adjacent said shoulder.

8. In a pneumatically cushioned seat mounting: a base; a guide post secured to said base and extending upwardly therefrom; a tubular support stem having an interior diameter substantially larger than the outer diameter of said post, receiving said post in its lower end and having a closed upper end; a seat bracket secured to the upper end of said support stem; a dome shaped casing including an annular lateral wall extending upwardly from said base and a crown extending inwardly from the upper extremity of said lateral wall and having a central aperture; a bushing through which said support stem is slidably extended, said bushing being secured to said crown in said aperture and having an internal annular groove; an O-ring mounted in said groove and sealing said bushing to the outer wall of said support stem; a dome-shaped diaphragm including a skirt fitted within said lateral wall, extending to said base and sealed thereto at its lower margin, and a reentrant, dished head extending inwardly from the upper extremity of said skirt adjacent said crown and having a central collar secured and sealed to the lower end of said stem; a relatively large volume cushioning chamber being defined between said diaphragm and base and a relatively small diameter rebound snubbing chamber being defined between said diaphragm head and said crown; and a bearing sleeve secured within said support stem, extending from the bottom thereof throughout at least a majority of the height thereof, and snugly engaging the external surface of said guide post, for maintaining said support stem in accurate coaxial relation to said guide post during vertical reciprocations of said seat bracket and support stem.

9. A seat mounting as defined in claim 8, wherein guide post is closed at its upper end and said support stem is imperforate above said guide post, a restricted volume air chamber being defined between the upper end of said guide post and the upper end of said support stem; and wherein said bearing sleeve consists in a strip of sheet material having the characteristics of nylon, wrapped helically around said guide post, a helical crack being defined between adjoining edges of said strip of bearing material and providing a helical passage communicating between said restricted air chamber and said large volume cushioning chamber.

10. A seat mounting as defined in claim 8, wherein guide post is closed at its upper end and said support stem is imperforate above said guide post, a restricted volume air chamber being defined between the upper end of said guide post and the upper end of said support stem; and wherein said bearing sleeve is in the form of a thin walled tube of material having the wear characteristics of nylon, said restricted chamber being sealed by said bearing sleeve and functioning as an auxiliary cushing chamber, said support stem having a counterbore in which said bearing sleeve is received and at the upper end of said counterbore having a shoulder abutted by the upper end of said bearing sleeve.

References Cited in the file of this patent

UNITED STATES PATENTS

| | | |
|---|---|---|
| 32,848 | Hoagland | July 16, 1861 |
| 431,387 | McHugh | July 1, 1890 |
| 576,419 | Wilmot | Feb. 2, 1897 |
| 2,760,552 | Decker | Aug. 28, 1956 |